A. BALTENSWEILER & K. EGLOFF.
GUDGEON PIN FOR INTERNAL COMBUSTION ENGINES.
APPLICATION FILED APR. 22, 1916.
1,223,355.
Patented Apr. 24, 1917.
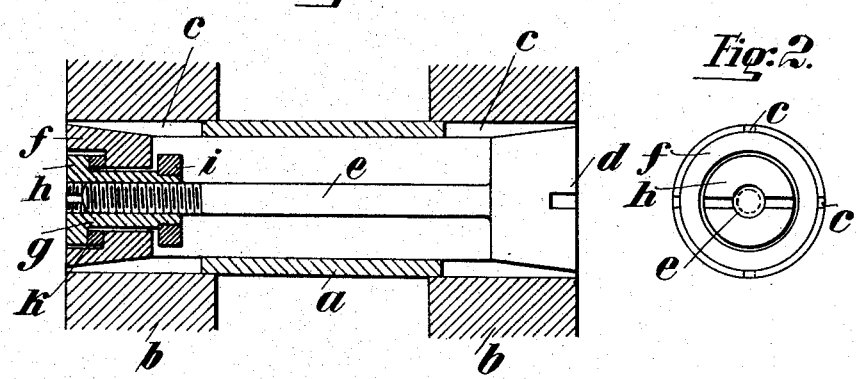

UNITED STATES PATENT OFFICE.

ADOLF BALTENSWEILER AND KURT EGLOFF, OF ARBON, SWITZERLAND, ASSIGNORS TO FIRM ADOLPH SAURER, OF ARBON, SWITZERLAND.

GUDGEON-PIN FOR INTERNAL-COMBUSTION ENGINES.

1,223,355.      Specification of Letters Patent.      Patented Apr. 24, 1917.

Application filed April 22, 1916. Serial No. 92,973.

*To all whom it may concern:*

Be it known that we, ADOLF BALTENSWEILER and KURT EGLOFF, citizens of the Swiss Confederation, and residing at Arbon, Switzerland, have invented certain new and useful Improvements in Gudgeon-Pins for Internal-Combustion Engines, of which the following is a specification.

This invention relates to gudgeon pins for internal combustion engines.

For the purpose of facilitating the fitting and removal of the gudgeon pins of automobiles and other internal combustion engines it has been proposed to employ a construction of pin in which the body of the pin is formed as a hollow member externally of cylindrical shape and internally formed with coned ends and with a number of longitudinal slits in the said ends, such pin being secured in position by means of a centrally disposed screwed pin having a conical head or collar at one end and a conical nut at the other by which, when the nut is screwed home, the ends of the gudgeon pin are expanded to grip the bores of the piston adapted to receive them.

While such a construction of gudgeon pin is effective for the purpose for which it is intended some difficulty is experienced in securing the pin in position as it is necessary to rotate the nut against the constraint imposed by the engagement of the exterior surface of the nut with the conically formed end of the gudgeon pin.

The invention has for its object to improve the construction of such gudgeon pin.

According to the invention the screwed pin may be provided at each end with a conical nut so that in securing the gudgeon pin in position both nuts can be rotated, and less rotation of each is required than is the case when a single nut is used, or that one may be rotated which is more readily turned in the conical end of the gudgeon pin.

According to a modification, in order to obviate the necessity of having to turn the nuts in their hollow conical seats when securing the gudgeon pin in position there may be provided at one end of the screwed pin a nut device which comprises an inner threaded member and an outer conical ring which requires to be shifted only longitudinally when tightening up. At the other end of the screwed nut there may be provided a plain conical head.

The invention consists in the construction, arrangement and combination of parts described hereinafter and pointed out in the claims.

A construction according to the modification is represented, by way of example, in the accompanying drawings wherein:—

Figure 1 is a longitudinal section, and

Fig. 2 is an end elevation of the gudgeon pin.

Referring to the drawings, the hollow gudgeon pin $a$ having slits $c$ in its ends is mounted in the walls $b$ of the piston. The ends of the gudgeon pin are conical internally. The conical head $d$ of the bolt $e$ is located in the one end of the pin $a$, and a ring $f$ in the other. In this ring is a nut $g$ having a flange $h$ on the one end and a collar $i$ driven on the other. This collar is riveted or otherwise fixed on the nut $g$ and is used for removing the ring $f$ from the gudgeon pin $a$. In order to prevent the nut $g$ from rotating an elastic washer $k$ is placed under its flange $h$.

Instead of the head $d$ being made integral with the bolt $e$, for the purposes of reducing the cost of manufacture it may be screwed on.

We claim:—

1. The combination with a cylindrical gudgeon pin having internally conical, elastic ends, of a threaded pin having a conical head located in the one end of the gudgeon pin, an internally threaded member screwed on the threaded pin, and an externally conical ring movably carried by the latter member and located in the other end of the gudgeon pin.

2. The combination with a cylindrical gudgeon pin having internally conical, elastic ends, of a threaded pin having a conical head located in the one end of the gudgeon pin, an internally threaded member having a flange at one end and a collar at the other end screwed on the threaded pin, and an externally conical ring movably carried on the latter member between said flange and said collar and located in the other end of the gudgeon pin.

In testimony whereof, we affix our signatures in the presence of two witnesses.

ADOLF BALTENSWEILER.
KURT EGLOFF.

Witnesses:
FRANK DIMUCKE,
EMIL MEILE.

Copies of this patent may be obtained for five cents each, by addressing the "Commissioner of Patents, Washington, D. C."